US00RE43178E

(19) United States
(12) Reissued Patent
Ghazarian

(10) Patent Number: US RE43,178 E
(45) Date of Reissued Patent: Feb. 14, 2012

(54) ELECTRONIC VEHICLE PRODUCT AND PERSONNEL MONITORING

(75) Inventor: Ohanes Ghazarian, Henderson, NV (US)

(73) Assignee: Loran Technologies, Inc., Chatsworth, CA (US)

(21) Appl. No.: 12/150,288

(22) Filed: Apr. 25, 2008

Related U.S. Patent Documents

Reissue of:
(64) Patent No.: 7,034,683
Issued: Apr. 25, 2006
Appl. No.: 10/013,278
Filed: Dec. 5, 2001

U.S. Applications:
(60) Provisional application No. 60/246,291, filed on Nov. 6, 2000.

(51) Int. Cl.
*G08B 13/14* (2006.01)

(52) U.S. Cl. ..... 340/568.1; 340/572.1; 340/988; 340/5.92

(58) Field of Classification Search ..... 340/573.1, 340/568.1, 568.7, 572.1, 522, 988, 989, 10.1, 340/5.31, 5.61, 5.92, 505; 700/213–217, 700/226, 228, 229, 225, 22, 28; 235/385
See application file for complete search history.

(56) References Cited

U.S. PATENT DOCUMENTS 5,497,149 A 3/1996 Fast
5,656,996 A * 8/1997 Houser ..... 340/541
5,886,634 A * 3/1999 Muhme ..... 340/572.1
5,959,568 A * 9/1999 Woolley ..... 342/42
6,104,311 A * 8/2000 Lastinger ..... 340/10.51
6,265,974 B1 * 7/2001 D'Angelo et al. ..... 340/568.1
6,313,733 B1 * 11/2001 Kyte ..... 340/7.22
6,323,566 B1 * 11/2001 Meier ..... 307/10.2
6,348,864 B1 * 2/2002 Lin et al. ..... 340/570
6,577,239 B2 * 6/2003 Jespersen ..... 340/572.1
RE39,909 E 11/2007 Taylor, Jr.

* cited by examiner

*Primary Examiner* — Anh V La
(74) *Attorney, Agent, or Firm* — LeonardPatel PC

(57) ABSTRACT

A system providing vehicle, pallet, and personnel tracking within buildings, vehicles such as trucks/trailers, buses, trains and aircraft at a site or in a global network system. RFID transponder Gate readers are used in building doorways, in vehicles such as tracks/trailers gates or bus doors to read pallets, packages and personnel equipped with RFID transponder and tamper proof RFID RF transceiver tags. The RFID-RF transceivers may contain a GPS/GSM modem for locating of pallets or personnel with RF or GPS location system. Site Buildings and vehicles are equipped with compute interface unit, to communicate at time intervals with RFID-RF tag transceiver units installed on pallets or personnel wristwatch, to indicate the presence of pallets or personnel at a site or in a vehicle. Tamperproof RF, GPS/GSM or satellite modems installed on vehicle are used to communicate with site station or to a monitoring station computer network (Server) with the collected data from said vehicle gate reader, for tracking and finding the location of a particular vehicle, and its cargo content or personnel information related to particular vehicle, at a remote or open site.

57 Claims, 8 Drawing Sheets

ELECTRONIC VEHICLE PRODUCT AND PERSONNEL MONITORING

Matter enclosed in heavy brackets [ ] appears in the original patent but forms no part of this reissue specification; matter printed in italics indicates the additions made by reissue.

*Notice: More than one reissue application has been filed for reissue of U.S. Pat. No. 7,034,683. The reissue applications are application Ser. No. 12/150,288 (present application), which is a reissue of U.S. Pat. No. 7,034,683, and application Ser. No. 13/304,601, which is a divisional reissue of U.S. Pat. No. 7,034,683.*

CROSS-REFERENCE TO RELATED APPLICATIONS

Non-provisional application of Provisional Application No. 60/246,291, filed on Nov. 6, 2000.

STATEMENT RE: FEDERALLY SPONSORED RESEARCH/DEVELOPMENT

Not Applicable

BACKGROUND OF THE INVENTION

Field of Invention

The present invention relates generally to systems and methods for tracking the location of vehicles, such as trucks/trailers, buses, aircrafts, trains, containers, cargo, pallets/packages and personnel, and more particularly to an improved system and method for tracking the location of a plurality of trucks/trailers, buses, pallets/packages or personnel at a particular location or a site to ascertain the exact location at which any vehicle, and it's content is located, as well as to ascertain when the proper pallet/package or personnel is being dropt off or picked up at exact given address. Locations at which relatively large number of vehicles, pallets/packages and personnel are present often suffer from the problem of determining exactly where each vehicle, pallet/package or personnel is. Whether a particular vehicle, pallet/package or personnel is located at a particular location when the business has several different sites, vehicles, pallets/packages and personnel is also problematic. This problem is particularly common to large and small trucking companies, railroad, freight companies, delivery companies, rapid transit public transportation, airlines, school bus service, utility companies, rental car agencies, leasing companies, distribution warehouse, retail stores, office buildings, and schools. In addition, such businesses must also deal with the theft of vehicles and the content in the vehicles, goods in warehouse, and the job attendance of employee. In schools, child school attendance is often an important task to be dealt with.

A number of different methods have been used in the past to deal with the problem of tracking the location of a large number of vehicles, its drivers, content delivery, or warehouse pallets/packages along with employee attendance, or school bus and child school attendance. The oldest of these methods is by keeping an inventory register of each vehicle and its content and its delivery records in a paper journal of some kind, or more recently, in a hand held computerized database. Inventory register depending on each individual operator may move a pallet/package for any reason, recording that move, as well as the vehicle's new location. Ultimately, this system will not accurately reflect the location of all vehicles, pallets/packages and personnel simply because not all employees at a location will enter each move of vehicle, pallet/package, personnel or student.

As might be expected, a variety of different approaches have been taken to attempt to solve the problem of monitoring large numbers of vehicles, pallets/packages and or personnel at a location or in a vehicle. These approaches vary widely, encompassing both increase security measures, proper global flow of distribution of goods, fixed and mobile inventory control, track vehicles with its content and personnel. With regard first to increase security measures of particular application to vehicle content at a location or at a warehouse site, the measures taken commonly include security fences or compounds, the use of video monitoring of area in which vehicles and cargo are stored, the use of motion sensor alarm in such areas, and the use of security guards to patrol such areas. While such approaches may reduce the incident of theft, somewhat, they are not useful in the addressing the primary problem contemplated by the present invention, namely how to keep track of the location of number of vehicles, its content, and securely deliver and pick up of pallets/packages at a given address, securely monitor the presence of pallets/packages, and personnel in a warehouse, truck/trailer, retail stores, schools, and in school buses, . . . , etc.

The "Electronic Tracking Tag" of U.S. Pat. No. 6,144,301 issued to Frieden discloses an electronic tracking tag attached to various assets to assist in asset identification. A plastic visual label display tag is used with a receiving cavity to mechanically lock an RFID transponder. The Tag body with the electronic transponder may be secured to the asset by screw. Alternatively, one or more flexible strap may extend in the tag body for strapping the tag body to the physical asset.

The electronic tag disclosed by Frieden does not provide tamper proof pressure sensing tamper switch with protective metal "O" ring, neither utilizes optical conductivity sensing nylon strap for strapping the tag on to a pallet or object. One can easily remove said tag and remove the asset undetected.

The "Radio tag system and method with improved tag interference avoidance" of U.S. Pat. No. 6,034,603 issued to Steeves teaches a data transmission system that includes a reader transceiver. The reader transmits an activation signal to a tag. The tag selectively transmits a response signal to reader at a specific time. The detector operates in a low-power standby state until the time it receives the activation signal.

The radio tag system disclosed by Steeves has an improved tag interference avoidance system that reads multiple tags within the range of a set radius, and the tag operates all the time at low power standby mode until an activation signal causes the tag to operate. Steeves' system fails to locate the presence of an object in an area with many partitions, or for example, where there are many building at a given site, within communication range of a site transceiver and tag units.

Use of mutter mode in asset tracking for gathering data from cargo sensors in U.S. Pat. No. 5,686,888 issued to Welles, al et. teaches goods being monitored while in transit using local area network of tracking assets. Electronic sensors are situated in proximity to the cargo. The sensors communicate with asset tracking unit affixed to the container. The tracking unit has the ability to relay the cargo sensor data to central station.

The sensors affixed to the container disclosed by Welles do not use tamper proof sensors. Therefore, one can easily remove and defeat the purpose of usage. Sensor's transmitting periodically creates collision problem and the sensor used in Welles system has to be programmed into tracking unit in order to poll sensor data. Additionally, the Welles system cannot differentiate presence of goods around or within container. Further, the Welles system does not generate an alarm system if goods are removed from the vehicle without authorization entry and does not activate stolen tag RF transmitter to transmit an alarm condition signal. Therefore, one could hardly locate a stolen asset.

The "Electronic anti-shoplifting system employing RFID tag" in U.S. Pat. No. 5,874,896 issued to Lowe, et al. teaches an electronic ant-shoplifting system that monitors articles of merchandise. The transponder tags are connected to articles of merchandise and a tag exciter is positioned at exit. If customer carries an article through exit without removal authorization, the transponder tag is activated by generating a surveillance response signal that triggers an alarm.

The tags used in Lowe's teaching does not have RFID transponder with built-in RF transceiver with power on circuitry, to account real time presence of an object affixed with a tag in a shopping area. The tag used in Lowe system does not use tamper sensing tags, one can thus remove the merchandise tag and walk away unnoticed, and one can move tagged merchandise out of a store, without being noticed by the tag exciter.

The "Asset Location System" in U.S. Pat. No. 6,069,570 issued to Herring discloses an asset location system that includes a pager, a control processor, a GPS receiver and a cell phone. During normal operation, the equipment on the tracked asset is in a low power or sleep mode. Upon receiving a location queerer from a call center, a control processor is powered up. The latitude and longitude information is put in a transmittable form by a cellular phone modem to a monitoring station.

The Herring system using a pager to receive queerer from a call and a cellular phone modem for transmitting data is not economically practical because one has to consider a minimum monthly service fee to be paid by user for pager and cell communication. This makes usage of the Herring system not to appealing to end user. The Herring system does not use a tamper resistive GPS/Cell modem, such that the GPS unit can be easily removed and its purpose be easily defeated.

The "Method and Apparatus for Providing a Personal locator, Access control and asset Tracking service using a building telephone network" in U.S. Pat. No. 5,363,425 issued to Muffi, et al. describes a system where users carry an ID badges containing an RF transmitters can be located across the telephone network for receiving incoming calls. The receiver units in or near telephone sets instruct the system of the identification of the user located near the telephone set. In additions tags are used on assets, which communicate with receiver units near telephone sets in a building for tracking asset movement across the building. The tag disclosed by Muffi does not provide Metal "O" ring protection around the tamper sensor switch; neither the optical nylon conductive belt body worn nor asset mount tags. The Muffi tamper sensing asset tags can easily be removed by sliding a flat object (knife. Envelop opener) beneath the tag and holding the pressure sensor switch to defeat its purpose, and the personnel ID tags can also be easily removed. The usage of building phone line limits the personnel and asset monitoring to building application only.

The "Personnel Monitoring Tag" in U.S. Pat. No. 5,745,037 issued to Guthrie, et al. discloses a method for accounting for plurality of persons based on random interval monitoring system to report information regarding the presence of both desired and undesired condition affecting a person. The method includes a first step of transmitting information signal based upon random times from individual tag worn by person corresponding to whether a tag is being worn and to certain activity of person, by use of pressure and motion sensor.

The tag disclosed by Guthrie et al. does not contain combination of RFID and RF transceivers. The tag's RF transceiver does not automatically activate by entry way magnetic interrogation, neither uses tag receiver push to weak up activation switch, and the tag mounting strap used in the Guthrie art is not of optical conductive nylon. The communication technique used in the Guthrie system cannot identify location of a tag in a specific room or a patrician in a building or even in trailers due to fact RF transceivers used in the Guthrie method could easily overlap each other. In addition, long-term random transmission from large number of tags in an area will create a communication collision due to fact long term tag transmitter RTC will change, and additionally when new personnel tag appearance in the system easily causes collision. The usage of spread spectrum communication in a site with large number of tags has its limitation, for example, the spread spectrum technique consumes higher energy and its expensive, means requires larger size battery which increases tags size and cost. Again pressure sensor switch and the strap used in Guthrie teaching could be defeated by sliding a flat object under the tag for holding the tamper switch, and conductive strap could be jumped by poking with an sharp edged external conductive material and cut the belt and enlarge the overall diameter of the strap and then tag can be easily removed.

The "Global Security System" in U.S. Pat. No. 5,497,149 issued to Fast describes a system for determining the position of an object to be protected using a local or global positioning system and issuing messages to a monitoring center at predetermined times and or a times when the object to be protected is under an alert condition, such as being outside an allowed position zone during a defined time period.

The Fast method does not apply for person or object mount GPS/modem or pager transceiver unit to power up and transmit object location information when an object leaves a designated site such as a building or a vehicle at any given time.

The "Decentralized tracking and routing system wherein packages are associated with active tags" in U.S. Pat. No. 5,627,517 issued to Theimer, et al. describes that, in freight tracking and touting system, each package is provided with a tag physically attached thereto. The tag includes a radio or infrared transceiver. The transceivers broadcast signals representative of their location. The microprocessor, in response to receiving a desired destination signal, emits a signal commanding external equipment to take the package so that it remains at the desired location. The tags are also capable of electronically queried, or can emit distress signal when they do not reach a particular location at a particular time.

Theimer system, although is useful in determining a package destination, uses the location transceiver that does not send package information from a distribution center to a vehicle or an aircraft mount GPS based unit in order to track package location, prompt delivery or pick-up, based on (longitude altitude) exact given address, neither use tamper resistive tag to avoid package theft.

The "Asset monitoring system and associated method" illustrated in U.S. Pat. No. 5,917,433 to Keollor et al. describes asset monitoring system providing remotely located central station with information relating to a container, both during tethered periods in which the energy reservoir of asset monitoring electrically is connected to an external power source, such as a truck, or using untethered mode when trailer energy source is disconnected. The controller includes power management means for placing the asset monitoring in an active mode during tethered periods and energy conservation mode during untethered periods.

Although Keollor energy serving method is useful, so as the trailer door sensors, it does not provide secure asset monitoring. Keollor's teaching does not provide tamper sensing GPS/modem transceivers unit, which upon tamper detection immobilizes the vehicle (truck/trailer) and transmit GPS tamper detection signal to a monitoring station. It additionally does not provide trailer door electronic lock mechanism which enables a remotely operated (key fob) unit for operator to be able to open trailer door at a given (longitude/latitude) address. Further, Keollor's teaching does not provide electronic RFID trailer gate readers to electronically log in and out pallets or packages there shall for trailer content cannot be monitored.

The "Security for Transport Vehicles and Cargo" in U.S. Pat. No. 5,969,595 to Schipper et al. teaches a method and apparatus for providing security vehicles and for cargo transported on a vehicle. A cargo unit carries a transceiver or transmitter that transmits a selected signal which is examined as to signal intensity, signal coding and or time of receipt. If the receiving signal violates a selected condition, vehicle location is compared with an approved cargo location. If the vehicle is not near the cargo destination, or if no selected signal received at the receiver, an alarm signal is transmitted, to a monitoring station which may include the vehicle location, and to a selected cargo transceiver unit to activate a become signal. The method further comprises the steps of locking said cargo unit when said vehicle leaves a selected location or to unlock the cargo carrying volume only at least one of the following locations is within selected distance from one approved cargo destination.

Schipper et al. is perhaps the most detailed of such apparatus for providing secure cargo transport on a vehicle illustrates both the benefit and the limitation of such system. While the Schipper et al. system is highly useful and represents a significant improvement in the art, it does not address the problem addressed by the present invention namely no tamper sensing GPS/modem unit being used which upon tamper detection immobilizes the vehicle and report to central station. No vehicle (trailer, railcar) electronic gate lock being used which opens only by operator key-fob, at given vehicle address location (longitude latitude). No vehicle gate tag RFID reader is provided to ascertain cargo being within the vehicle, and no use of RFID Reader, which automatically powers up the tags upon entry to communicate with vehicle transceiver unit for real time presence authentication. The cargo tags are not equipped with pressure sensing protective "O" ring tamper switch, neither uses tags with tamper sensing optical nylon conductive strap for mounting the tags on cargo. The Schipper system cannot secure the vehicle and its cargo content, thus one easily can remove the vehicle mount GPS/modem unit and drive away with the vehicle and steal the cargo content without being tracked. The cargo tags can be removed and dropped near or within the vehicle, and cargo can be taken away without being tracked. Unlocking of cargo container by distance at an approve destination used in Schipper teaching, cannot secure the cargo at an approved destination. One will assume in an approved destination center, upon cargo arrival the cargo lock opens near warehouse distribution center. Any one at distribution center can open the cargo door detach the tags and remove the cargo without being noticed or detected.

The "Programmable Vehicle Monitoring and Security System having access verification Devices" in U.S. Pat. No. 5,986,543 to Johnson teaches a security system having two ways communication with a central monitoring station. Control communication connected to intrusion detection devises. The control unit in response to detection of an intrusion establishes a communication leak with monitoring station. The control and communication devise is operable to receive commands from a handset electrically connection.

Johnson disclosure of a detecting intrusion is a useful art, however Johnson does not use tamper detection GPS/modem unit, neither tamper sensing cellular or GPS antenna. One can disconnect or break the GPS or cell antenna found in Johnson system or access the vehicle disconnect the GPS modem and drive away with the vehicle.

"Method for retrieving vehicular collateral" in U.S. Pat. No. 6,025,774 to Forbes describes a method of securing vehicle for a loan. The method provides for installing a transmitter within the vehicle, the transmitter is capable of transmitting location data regarding the vehicle. A data link is established from a base terminal to the transmitter of the vehicle. The loan status is being monitored for default from a monitoring station. Upon occurrence of the default, the location of the vehicle is determined, and the vehicle is confiscated.

Forbes method is very useful but not dependable for securing vehicle loan. If one forfeits the loan and had no intention to return the vehicle, could easily defeat the GPS antenna or the entire GPS/Cellular modem and drive away with the vehicle. Even ship the vehicle out of the country without being tracked.

It is accordingly the primary objective of the present invention that it provides an secure electronic vehicle, cargo, and personnel tracking information system which will track the present location of each of plurality of vehicles, pallets, and personnel at a location such as, for example, on the road, railways, trailers, trucks, aircraft, buses, in warehouses, retail stores, offices, homes, schools, . . . , etc.

It is a related objective of the present invention that the monitoring of vehicles, cargo, and personnel location at the location be performed completely automatically via GPS/modem, pager or satellite and RF wireless data communication, with use of computer network, intranet or internet. It is a further objective of the electronic vehicle, cargo, personnel tracking information system of present invention that it be capable of automatically determining when each vehicle arrive and departs from a site and be able determine which cargo, or personnel (passenger, student) securely got pick up or delivered by a vehicle at a given site address. It is a further objective of the invention that is capable to determine when each cargo or personnel entered or exit a site and provides real time secure presence inventory or attendance count, at mobile or fixed sites. It is further objective of present invention to provide security by immobilizing vehicle upon equipment tamper, use site and vehicle gate RFID readers, provide electronic vehicle (Truck/Trailer) gate lock unlock operated by driver remote key fob responsive only at given address, and tamper resistive communication devises on vehicles, cargo, and personnel. It is further the objective of the invention to determine vehicle driver and loader authentication and access recording; and to track and locate stolen vehicle and cargo or lost or kidnapped personnel.

BRIEF SUMMARY OF THE INVENTION

An electronic vehicle, cargo and personnel monitoring system is provided, allowing a vehicle to electronically login its product content (pallets, products) ID, its driver or passenger(s) ID into an on board vehicle CPU. The CPU will communicate via an RF signal containing information of the vehicle, cargo (product) and driver/passenger, with a base station(s) computer or computer network which indicates the presence or absence of a vehicle at a site, its cargo content and its driver/passenger ID at a predetermine site.

A Base or site station computer is connected to a RF transceiver unit to communicate with a vehicle-mount RF Transceiver CPU, and cargo tags or driver/passenger tags.

A vehicle-mount tamper proof RF transceiver CPU with an RFID tag reader is installed within the vehicle doorway, in which when tagged object goes through vehicle door, the tag read unit will read the tag and send said tag information to vehicle RF transceiver unit, and vehicle transceiver unit communicates with the base or site station computer unit, with information relating to vehicle content, such as vehicle cargo and driver/passenger equipped with a RFID tags.

In a preferred embodiment an RFID transponder with RF tamper proof transceiver tag units are installed in or outside of cargo with adhesive tape, mounting screws or an optical nylon (string) conductive strap, to communicate in time interval with vehicle mount transceiver CPU unit and base station computer transceiver unit.

A RFID Tamper proof transceiver tag unit with an optical nylon conductive strap is mounted on a person wrist or ankle to communicate with the vehicle-mount transceiver CPU unit and the base station computer interface transceiver unit.

A product or a person carrying an RFID tag its data information is logged in manually or by a tag read unit and downloaded into a base station PC. This indicates the presence of a particular product or person(s) (part of inventory) at a site, for example, a factory, retail store, school site. The site gate(s) is equipped with RFID tag read unit connected to the site computer interface transceiver unit. When a product or a person carrying RFID tag passes through said gate, the gate read unit reads the ID tag and said site computer indicates the departure or entry of the particular product or person departure from said site. If the product or person passes through said gate without computer-authorized access code, the computer would generate an alarm signal to the operator and autodials to a central monitoring station or to a pager system indicating a security violation.

A vehicle (truck, trailer, aircraft, railroad car, bus etc.) is equipped with a RF transceiver CPU when said vehicle arrives at a particular site, RF signals containing information of a particular vehicle are periodically sent to said site PC by means of a switch, such as a push button switch, ignition switch, a door switch or an emergency brake switch. When the site computer interface unit receiver receives the signal from the particular vehicle, the site station computer unit indicates the presence of the presence of the particular vehicle at that particular site. Or upon receipt of signal, the computer creates a communication slot (transmitting air time) in its database memory to communicate at time intervals (once a minute) with said particular vehicle transceiver CPU unit with an RF signal containing data information of the particular vehicle RF transceiver CPU, to verify particular vehicle presence at a particular site. Additionally the vehicle is equipped with an RFID tag read unit(s) mounted at vehicle doorway(s) or gate(s) and connected to vehicle mount RF transceiver CPU. When a product or a person carrying RFID tag unit(s) enters the particular vehicle, the vehicle RFID Tag read unit reads the tag ID of the particular product(s) or person(s) and logs the information data in to the vehicle CPU, and the CPU transmits the particular vehicle, product or person(s) tag ID to said site computer interface unit, and said site computer interface sends signals to said vehicle CPU with a RF coded signal indicating to driver acknowledgment of right product or driver/passenger entered the particular vehicle and stores said information in a central server.

In a preferred embodiment of the invention the vehicle CPU upon receiving signals from site computer transceiver, transmits the vehicle CPU ID, product and or person(s) ID information data to the site computer interface unit, which indicates a particular vehicle ID, containing particular product(s) and particular person(s) at a particular site at a set time and date. The base station computer interface unit gives live update to the operator(s) periodically by communicating, for example, once a minute, with the vehicle transceiver CPU unit to confirm the presence of a particular vehicle and its content at a particular location.

If a product or a passenger boarded in a wrong vehicle, the computer initiates a an alarm signal, and sends a signal to the vehicle CPU, which generates a audible alarm signal indicating to the driver, boarding of a wrong product or passenger into that particular vehicle. When the vehicle departs and is out of communication range, the base station computer indicates the absence of the particular vehicle at that particular site. If unauthorized (without computer access code) departure of vehicle takes place from said site and said vehicle transceiver CPU becomes out of communication range or said communication becomes interrupted 2 interval times with the site computer transceiver unit, the site computer initiates a security violation signal and sends said data information to monitoring station.

In a preferred embodiment of the invention, the vehicle uses a tamper sensing RF transceiver CPU, a GPS cellular modem or 2-way pager with a tamper sensing antenna. The units are equipped with pressure sensing tamper switch on its case; and the case for mounting the tamper switch mount is installed on the vehicle body or window. The vehicle transceiver CPU or GPS/modem and the antenna unit is communicating with digital data with said vehicle fuel pump or starter relay circuitry, so as to operation the vehicles fuel pump or starter. When an unauthorized attempt is being made to remove or disconnect the vehicle RF transceiver, the GPS/modem or antenna, the RF transceiver or GPS/modem processor sees sending (or sending intermittent) digital data to the vehicle fuel pump or starter relay, thus slowing down the vehicle speed and immobilizing the vehicle or immobilizing the vehicle starter circuitry, and transmitting a RF or cellular or pager "tamper" signal to a monitoring station. The tamper signal contains information to the particular vehicle unit with a "tamper" detection signal along with location information. Same process takes place when the vehicle RF transceiver CPU and GPS/modem or antenna cable is being interrupted by an unauthorized person or when units gets abused or damaged, becomes inoperative.

When the vehicle arrives a predetermined destination to unload its product(s), the vehicle CPU communicates with an RF signal with the particular site computer transceiver unit, the site computer, upon receiving said signal, logs the particular vehicle ID presence into that site computer and sends a unique RF coded signal to the vehicle CPU which will generate a signal to vehicle door locks mechanism to open, by use of drivers key fob, and permit driver to unload particular product at that particular site. Each one of said products carrying RFID tag departing from said vehicle is scanned by said vehicle gate tag RFID read unit and said information is logged into vehicle CPU unit. The logged data is transmitted into a site computer interface by means of RF communication, which indicates a particular product drop off at that particular site. If unscheduled product drop off at the wrong site takes place the site computer will create an alarm warring signal and send a RF signal to the vehicle CPU that will notify the driver by means of an alarm signal.

When a bus arrives a predetermined destination to unload its passenger(s), the person carrying RFID tag departs (exit) from the vehicle is scanned by the vehicle door tag RFID read unit and said information is logged in vehicle CPU. The logged data is transmitted into said site computer by means of RF communication and the site computer, upon receipt of said vehicle signal, the computer unit confirms the vehicle CPU that the right person(s) have been dropped at the right site.

When the vehicle arrives a predetermined destination to load product(s) or person(s) storefront, house, the vehicle CPU communicates with the particular site computer transceiver unit. The site computer, upon receiving said signal, logs in the particular vehicle ID presence into that site computer which indicates by an audio visual signal for the presence of a particular vehicle at a particular site. When a product(s) or person carrying RFID tag unit enters the vehicle, the vehicle tag reader unit, upon reading each of said tag unit, connecting to the vehicle transceiver CPU, the CPU transmits a RF signal containing information of said vehicle ID and said product or person tag ID, into the site computer transceiver unit. When the site computer transceiver unit receives the signal, transmits the vehicle's ID and the product or person ID information to a central station computer and sends a RF Data signal to the vehicle transceiver CPU, which upon receipt of signal, produces confirmation signal to the driver indicating the boarding of a right product or person at a site.

In a preferred embodiment of the invention each one of said tamper proof RFID transponder tags additionally is equipped with a RF transceiver unit powered by a battery. When a product (pallet) or person carrying said RFID/RF transceiver tag enters a site (building) equipped with RFID tag read unit at its gate(s) or door(s), the tag reader reads the entered tags and sends the information to the site computer. Upon reading the tags RFID information, the computer creates a particular slot (communication air time) in its data base memory to communicate at time intervals (once a minute, for example) with said tag transceiver by a RF signal, so as to indicate presence of a particular tag unit at that particular site, at a set time. The product RFID RF transceiver is equipped with a pressure sensing tamper switch and is installed in or outside of a product, the tamper sensing switch side being faced to the product, and mounted on by use of double sided adhesive tape, or magnet or mounted by screw(s). Additionally a conductive strap could be utilized over, under and across a product (pallet) connected to the RFID RF transceiver tags to avoid product (pallet) temperament. Further, an RFID RF transceiver unit is mounted with a conductive strap on a person wrist or ankle to be monitored. If unauthorized removal of any tag occurs, the tag tamper switch senses removal of tag from the product or person. If the conductive strap is being cut, in both cases the tag RF transceiver unit transmits a tamper signal. The site computer transceiver and vehicle CPU unit, upon receiving said signal, issue a tamper alarm signal to monitoring station to alert security personal. If a product or a person exits the site through a gate with computer controlled clearance code, when the RFID RF transceiver unit goes out of site communication range within a predetermine time, the RFID RF transceiver stops transmitting time interval signal to save energy. If unauthorized attempt is been made (without computer clearance) to remove the product (pallet) or the person walks away from the site gate, the site gate tag read unit upon reading the product or person RFID-RF transceiver signals, the site computer indicates a security violation, and the computer transceiver unit initiates a security violation RF coded signal to the particular product RFID-RF transceiver tag unit, which upon receipt of said security violation signal, starts transmitting a RF signal containing information to the particular product with security violation code. In another embodiment of invention, if a product or person becomes (without computer clearance) out of computer communication range or communication between the site computer and a particular RFID transceiver tag becomes interrupted (after 2 communication attempts), the site computer will initiate an alarm signal, and send a signals to a central station via public phone or paging network for quick recovery a hand held, patrol car or chopper mount RF scanner unit used to locate stolen product.

Since a vehicle CPU unit requires a product unloading clearance signal from a site computer transceiver, if and when a vehicle gets car jack or driver decides to unload some or all of its product(s) or pallets in an unauthorized location site without receiving clearance signal, the vehicle CPU sends a RF signal to the particular product RFID-RF transceiver tag when the product passes through the vehicle gate tag read unit. Upon receiving the signal, the tag RFID RF transceiver unit transmits an RF signal containing information to said particular RFID-RF tag along with security violation code. In a preferred embodiment of the invention the vehicle (truck/trailer) gates open (for loading or unloading product) with the use of electronic gate locks (Solenoid Dead bolt) the gate lock will lock or unlock only after receiving a gate open or close RF signal from a particular base station or site computer transceiver unit. If an unauthorized attempt is made to open the gate without base station signal, the vehicle CPU transceiver unit will transmit an RF signal containing information of that particular vehicle with a security violation code to a base station or monitoring station computer.

It is an objective of the present invention to utilize a GPS/modem or pager unit to communicate with a monitoring station or a site station, so as to monitor vehicle location, its driver authentication and personnel (passengers, students) information, by connecting said vehicle GPS unit to a vehicle gate or door entryway installed RFID tag reader, which logs in and out tagged cargo or personnel within said vehicle. It is another objective of the present invention to provide proper flow of product and personnel distribution, by comparing product and personnel tag data read by vehicle GPS RFID reader unit, with the destination data stored in vehicle GPS unit. If the product or personnel is scanned by the vehicle RFID reader as they exiting the vehicle, and if the personnel or product RFID tag scanned information such as the actual physical location of vehicle by longitude/latitude does not match the given product or personnel address stored within the GPS unit database, the vehicle GPS unit will send an alarm signal to the driver. If the driver does not return the wrong tagged product or personnel back into truck/trailer or bus within a predetermined time, the GPS modem unit will transmit an security violation to a monitoring station.

It is another objective of the present invention that provides an electronic dead bolt lock to lock said truck/trailer or bus door(s), which will activate by receiving a signal from a driver key fob unit only when vehicle mount GPS unit arrives a given address that matches the address information entered in the GPS data logger (longitude/latitude). In a preferred embodiment of the invention, the vehicle uses a tamper sensing RF transceiver CPU and a GPS cellular modem or 2-way pager with tamper sensing antenna. The units are equipped with pressure sensing tamper switch on its case. The side of the case for mounting the tamper switch is installed against the vehicle body or window. The vehicle transceiver CPU or GPS/modem and the antenna unit is communicating with digital data with said vehicle fuel pump or starter relay circuitry, so as to operate the vehicles fuel pump or starter. When an unauthorized attempt is being made to remove or disconnect the vehicle RF transceiver, GPS/modem or antenna, the tamper switch triggers the CPU or GPS/modem. The RF transceiver or GPS/modem processor sees sending (or sending intermittent) digital data to the vehicle fuel pump or starter relay, thus slowing down the vehicle speed and immobilizing the vehicle or immobilizing the vehicle starter circuitry, and transmit a RF or cellular or pager "tamper" signal to a monitoring station, containing information about a particular vehicle unit with a "tamper" detection signal along with location information. Same process takes place when the vehicle RF transceiver CPU and GPS/modem or antenna cable is being cut or disconnected by an unauthorized person or when units gets abused or damaged, becomes inoperative.

In the present invention in order to monitor the product and person with an unlimited distance monitoring capability for long period of time, each one of said RFID-RF transceiver tag unit additionally contains a GPS/cell modem, pager, or a satellite communication unit, which is installed on the product (pallet) or person. The GPS/cellular modem or pager or satellite unit is in power-off mode in order not to use energy. When any of said product or person carrying departs without computer clearance from said site or vehicle equipped with RFID gate read unit and RF transceiver unit, when the tag passes through the gate reader by generating a magnetic field, which will power up the RF transceiver, and the RF transceiver upon receiving security violation code will power on the GPS/modem unit. Both the GPS and RF transceiver will transmit an emergency stolen good signal. In addition, if the transceiver tag read unit goes out of communication range of said site computer or vehicle RF transceiver, the site computer or vehicle transceiver will initiate a security violation signal to said RFID RF transceiver tag, which, upon receipt of said signal powers up said tag GPS/cellular modem or pager, which will then transmit GPS based product(s) or person(s) location information along with said RFID tag information to a monitoring station.

Additionally all said RF communication between said vehicles and said base station can use a mobile phone, 2-way pager, UHF/VHF, or satellite communication means.

If the location of a particular product(s) or person(s) on a site (warehouse, factory, school) is desired, a plurality of transponder read units is installed at an assigned spots at a predetermine location at a site. When any one of said products or person carrying said RFID tag unit comes close into communicating range (within 2 meters), said transponder read unit communicates with said RFID tag unit and transmits said RFID tag information to said site PC and said PC logs the data information and displays location of said product or person on its monitor. In a preferred embodiment of the present invention a plurality of short range (1-5 meter) low power RF proximity transmitters unit powered by a battery is installed at a assigned spot(s) at a predetermined location at a site, transmitting periodically (every 12 Seconds.) with a unique identification code. When a product or person carrying the RFID transceiver unit receives a RF signal from said site computer transceiver unit, said RFID transceiver unit being within communication range of said proximity transmitter unit (within predetermined time of 12 sec.) will read said proximity transmitter unit ID code data and transmit a RF signal containing information for both said proximity unit and said product or person RFID transceiver unit, and when said site computer transceiver unit receives said signal will indicate said product or said persons presence along with its location at a site.

Additionally each one of said RFID-RF transceiver units could have a built in push button allowing the user to read a particular spot proximity transmitter ID data by pressing said button. Upon reading said proximity transmitter ID, the RFID transceiver transmits a signal containing both proximity transmitter and RFID-RF transceiver data information to a site transceiver PC, which will indicate the presence of a product or person with its location at a site.

DETAILED DESCRIPTION OF THE INVENTION

Figure 1A:
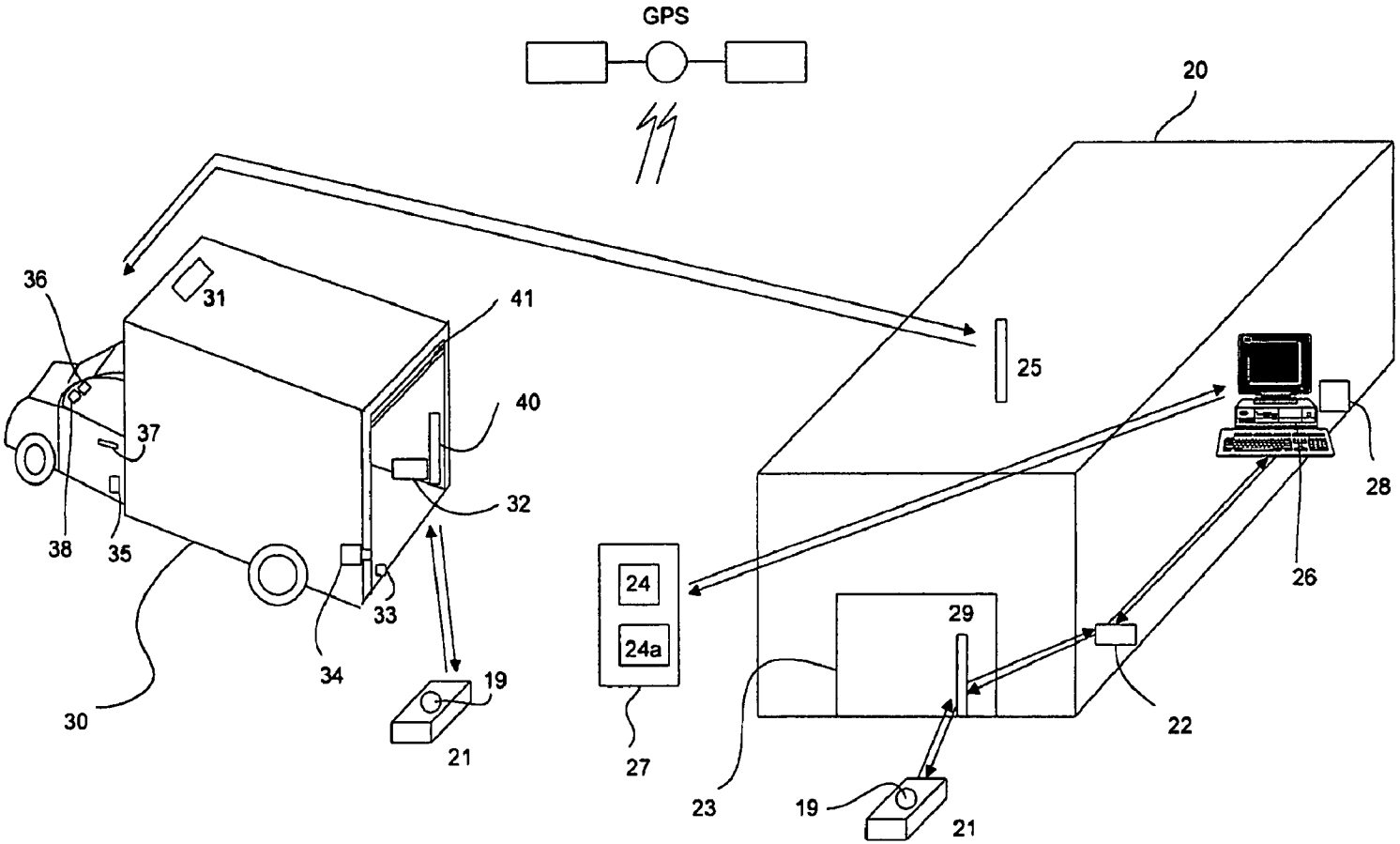
FIG. 1A. illustrates a system for monitoring vehicle product and personnel.

An embodiment of an electronic vehicle and cargo tracking information system of the present invention is illustrated in FIG. 1A. As shown, a site station warehouse 20 is equipped with a RFID gate read antenna 29, a RFID gate reader 22 and a site station RFID read CPU, which is connected to a site station computer 26. A RFID tag 19 with a unique code is mounted on a pallet 21, and said unique code is programmed in to the site station computer 26. When an operator of the site station computer 26 registers an invoice or bill of lading, the content of the pallet 21 and an RFID tag ID number of the pallet 21 are input into the site station computer 26. In addition, the vehicle 30 for transporting the pallet 21 includes a RF transceiver 36 which will present an ID number and destination address of the pallet 21. When the pallet 21 departs through the gate 23 of the site station 20, the gate RFID reader antenna 29 will energize the RFID tag 19 of the pallet by means of magnetic field. The ID code data of the tag 19 mounted on the pallet 21 is thus transmitted to the RFID gate read antenna 29. The gate RFID antenna 29 then transmits said data through said station RFID reader 22 into the site station computer 26. Thereby, the departure of said particular pallet 21 from its inventory system is indicated.

Figure 3A:
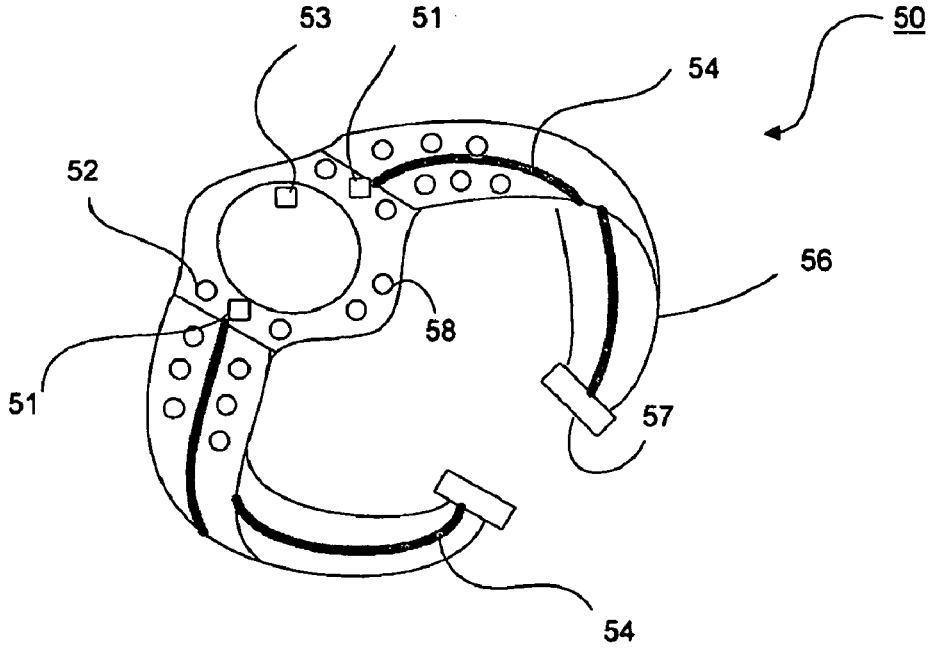
FIG. 3A. illustrates a tamper sensing wrist tag with built in RFID transponder and RF transceiver with optical nylon conductive strap.
Figure 3B:
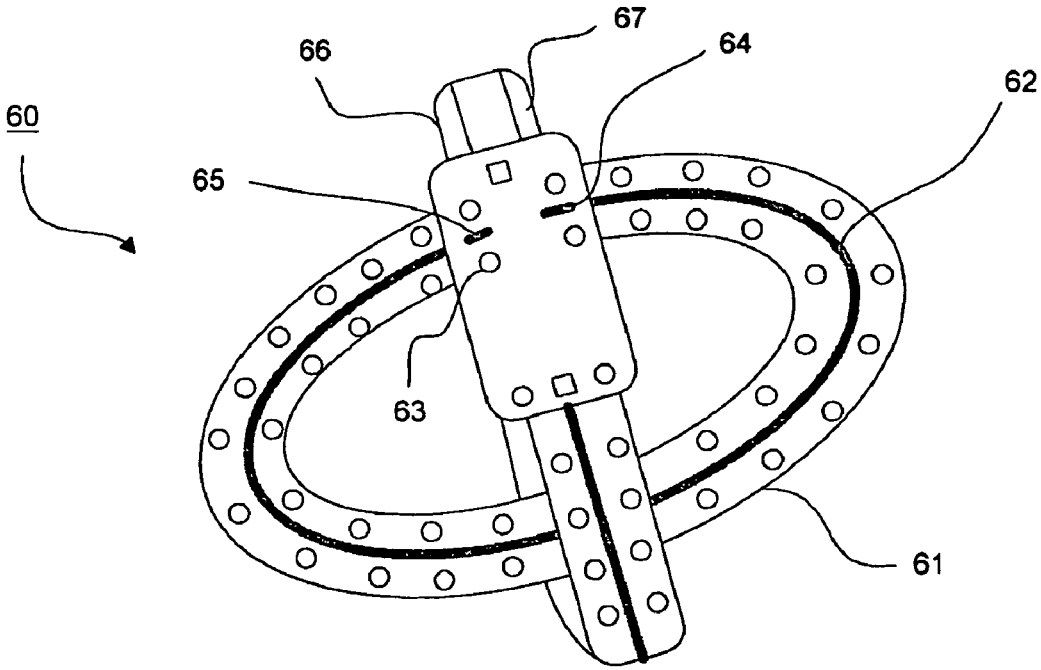
FIG. 3B. illustrates tamper sensing cargo or personnel using GPS/modem with optical nylon conductive belt.
Figure 3C:
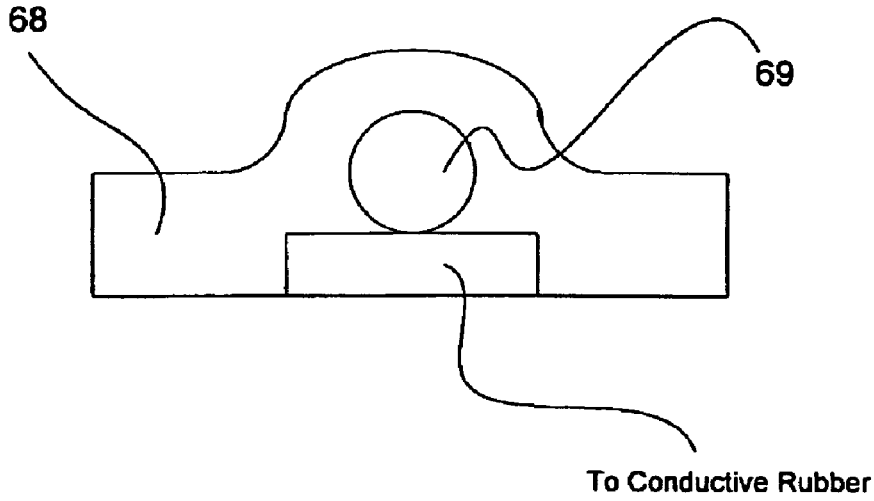
FIG. 3C. illustrates a cross sectional view of the as shown in FIG. 3B.
Figure 3D:
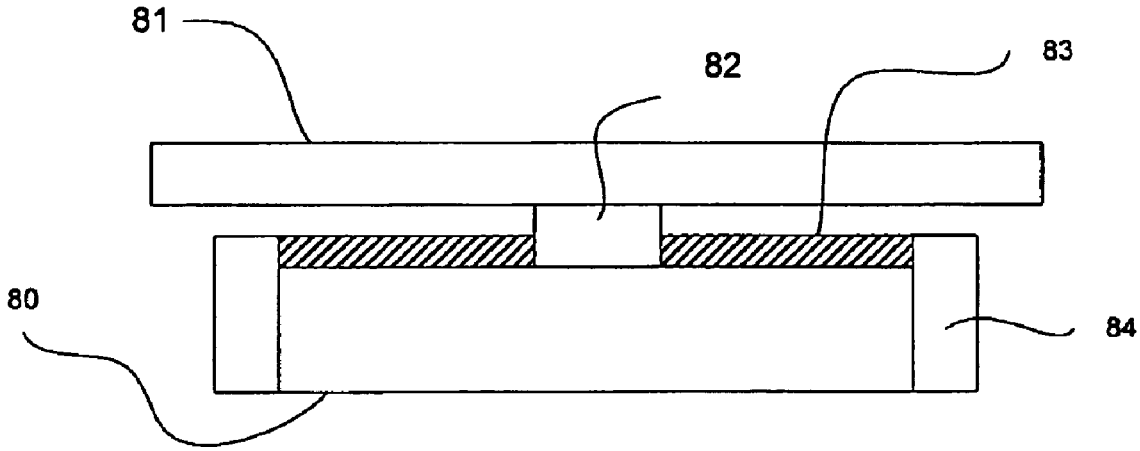
FIG. 3D. illustrates tamper sensing RFID-RF transceiver tag with mounting adhesive tape, side view.

The vehicle 30 is equipped with a RFID gate read antenna 40, a RFID read CPU 32 which is connected to a vehicle RF transceiver CPU 36 and a driver RFID read antenna 37 connected to said vehicle RFID read CPU 32. A driver 27 may wear a RFID wrist mount transponder or a tag 24 with a unique ID code to enter the vehicle 30. Upon turning the ignition key on, said vehicle RFID tag read CPU 32 will read said driver RFID tag 24, and sends the driver ID information data to the vehicle RF transceiver CPU 36, which stores the driver authentication information in the RF transceiver CPU data base. The vehicle RF transceiver CPU 36 starts sending digital data through vehicle harness. Said data is being picked up by a vehicle immobilizer CPU 128 as shown in FIG. 3H. Upon receipt of the data, the vehicle immobilizer CPU 128 will energize a vehicle starter or fuel pump relay 129, allowing the driver 27 to operate the vehicle 30. In a preferred embodiment in order to operate the vehicle fuel pump, it necessary for the vehicle RF transceiver CPU 36 to provide constant data flow through vehicle wires to said immobilizer CPU 128, otherwise the vehicle immobilizer CPU 128 will shut down the vehicle fuel pump relay 129.

When the vehicle 30 arrives near said site station 20, by pressing vehicle RF transceiver CPU 36, or by turning the vehicle 30 in parking position (which will activate transmission switch), the vehicle RF transceiver CPU 36 will transmit an RF signal containing information of said vehicle 30. Said site station RF transceiver 28 receives said signal through the site station RF antenna 25, and uploads said vehicle ID and driver ID information in the computer data base 26, and indicates the presence of said particular vehicle 30 at that particular site 20. A RF signal is transmitted through site station RF transceiver 28 into said vehicle RF transceiver 36, so that the driver 27 can use of a remote key-fob to transmit a signal into the vehicle RF transceiver CPU 36, so as to unlock vehicle gate lock solenoid 34. The site station computer operator, based on the driver and vehicle information, can prepare the particular vehicle and particular cargo bill of lading (invoice).

When the vehicle gate 41 is opened, the vehicle gate switch 33 sends a signal to the vehicle RFID read CPU 32, which energizes the vehicle gate read antenna 40 by a magnetic field. When a particular pallet 21 with RFID tag 19 is loaded in the truck 30, the vehicle RFID gate reader antenna 40 upon interrogating the pallet tag and loader (driver) tag 24, sends the pallet tag ID data and the driver tag ID data to the vehicle RFID read CPU 32. The data is processed and sent from the vehicle RFID read CPU 32 to the vehicle RF transceiver CPU 36, which further transmits said vehicle ID, driver ID and pallet ID information into said site station computer 26. Thereby, the specific vehicle 30, driver (Loader) 27 and pallet 21 which is located within the particular vehicle 30 can be indicated, and the given bill of lading instruction into the site computer 26 matching the vehicle ID, driver ID and pallet ID can be retrieved.

When the vehicle 30 arrives at a given cargo destination site (picture not shown), after logging the vehicle 30 presence at the site computer, a gate open signal from a site computer interfaced RF transceiver is received. When the driver 27 moves the pallets 21 out of vehicle 30, the vehicle RFID read CPU 32 reads the driver and pallet ID and sends the data via the vehicle RF transceiver CPU 36 into said site computer 26. Since the system runs on intranet or internet data base, the destination site computer will accept the delivered pallets 26 to be logged in database as part of incoming inventory. If a pallet 21 was not destined to said particular site station, the site computer will generate an alarm signal, indicating wrong package arrival at the site. The site computer also sends an RF signal to the vehicle RF transceiver unit 36 for notifying the driver to reload the pallet 21 back into truck inventory.

In a preferred embodiment of the invention, at least one tamper sensing RFID tag is provided with a unique code and connected to a built-in RF low power transceiver with the same unique code. The tamper sensing RFID tags are powered by a battery. As shown in FIG. 3D, an RFID/RF transceiver tag 80 mounted to a product 81 is equipped with a reset switch 84 and a pressure sensing tamper switch 82. FIG. 3G shows a top view of a tamper sensing RFID tag 90 that includes a pressure sensing tamper switch 91 protected by a metal "O" ring 94. The tags 80, 90, are mounted on pallets 100 or product 81 with the use of screws 92, adhesive tape 83, 93. The adhesive tape 93 may also be replaced by magnet 93, for example.

Figure 3E:
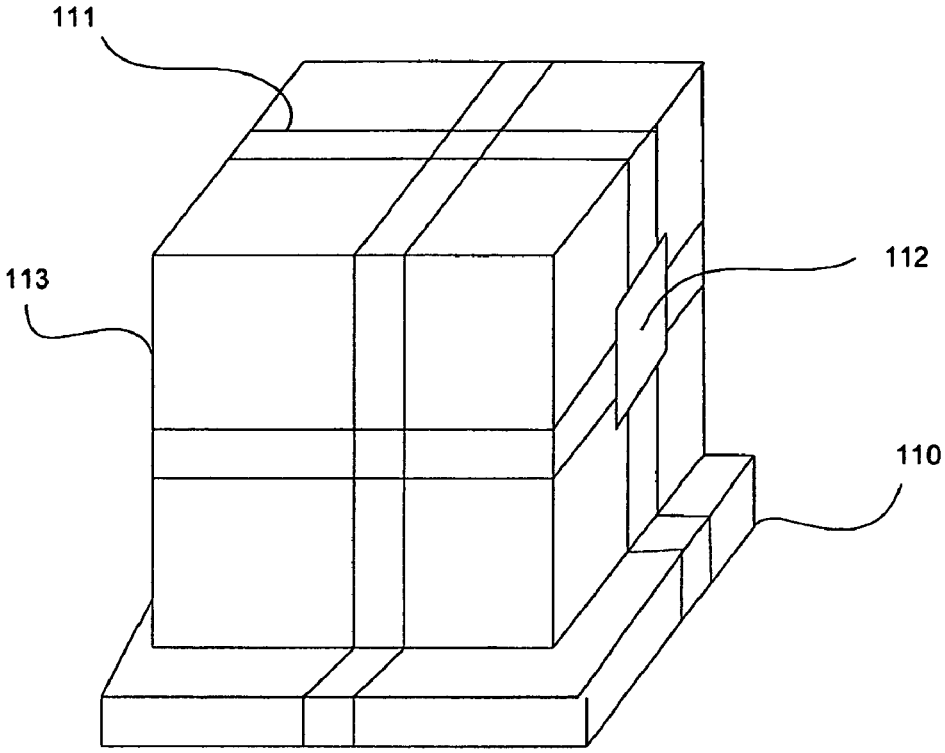
FIG. 3E. illustrates tamper-sensing pallet RFID-RF transceiver tag wrapped with conductive strap.
Figure 3F:
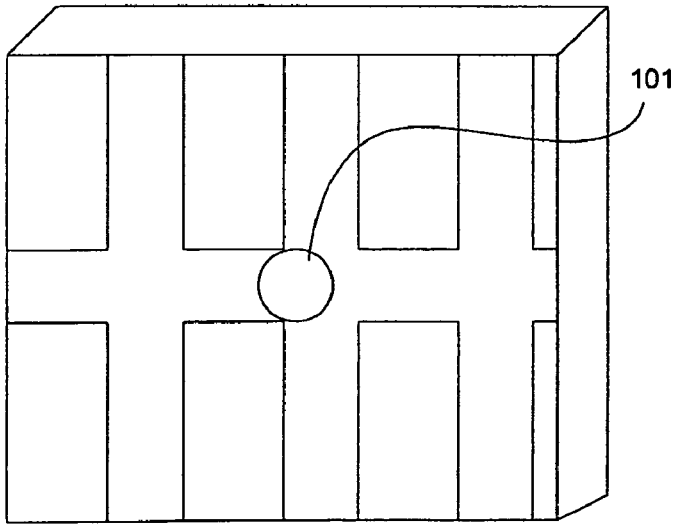
FIG. 3F. illustrates a tamper sensing RFID-RF transceiver mounted on the bottom of a pallet.
Figure 3G:
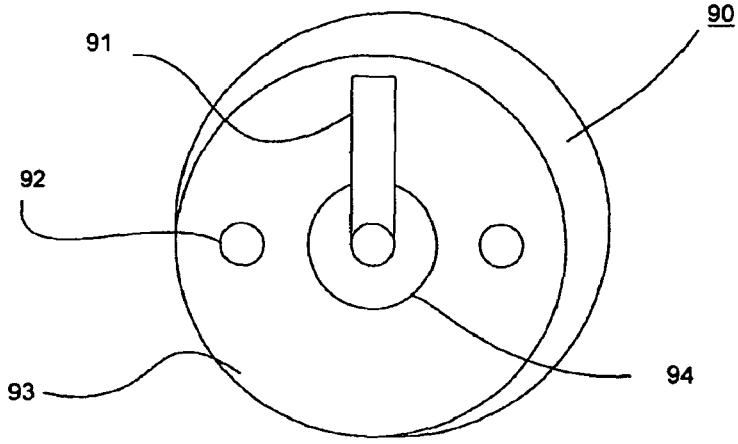
FIG. 3G. illustrates a bottom view of tamper sensing RFID-RF transceiver tag with pressure sensing taper switch surrounded by tamper resistive metal "O" ring.
Figure 3H:
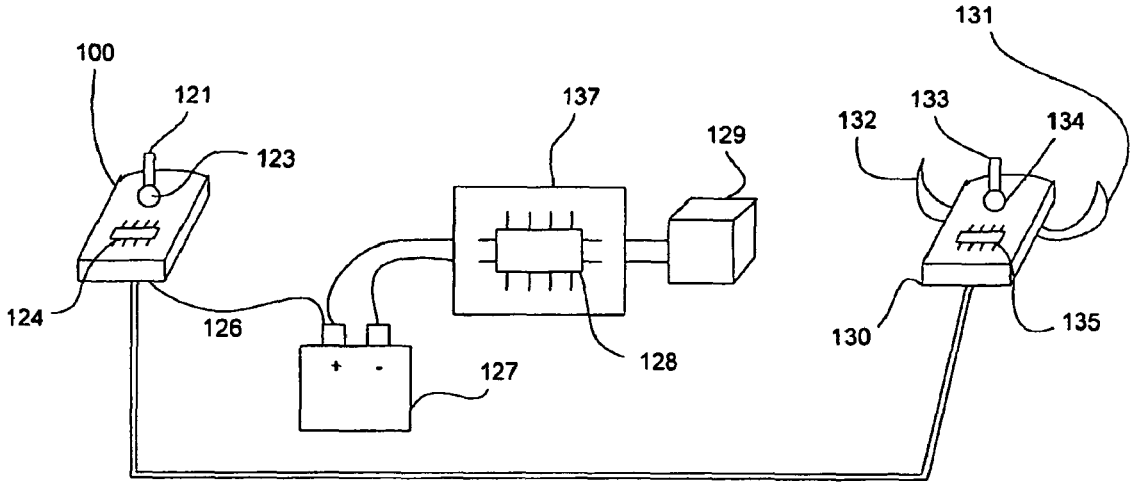
FIG. 3H. Illustrates a bottom view of a temper sensing vehicle RF transceiver, RFID read unit and GPS/modem unit with temper sensing GPS, cellular antenna and digital data read immobilizer CPU.
Figure 4:
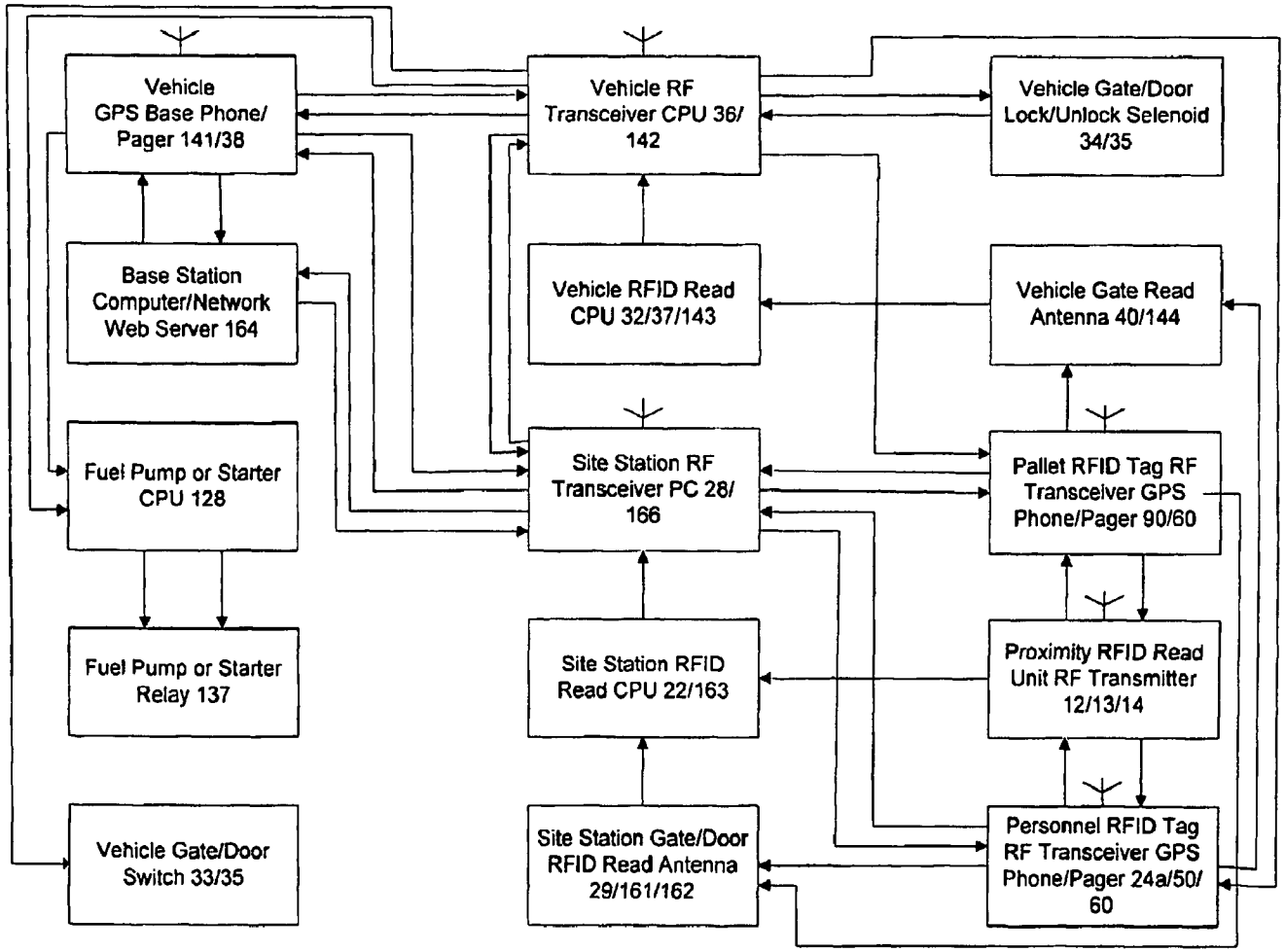
FIG. 4 is a block diagram of the monitoring system as shown in FIG. 1A and/or FIG. 2.

In another teaching of the new art, the tag is mounted on a pallet 110 as shown in FIG. 3E. In this embodiment, a tamper sensing conductive strap 111 is used to tie a product 113 with the pallet 110, and a conductive strap RFID RF transceiver 112 is attached to the strap 111. FIG. 3F shows a bottom view of the pallet 110. As shown, a tamperproof pallet mount RFID/RF transceiver 101 is mounted to a bottom surface 100 of the pallet 110.

In one embodiment, the driver RFID tag 24 may be in the form of a tamper-sensing wrist-mount watch-style RFID tag 50 as shown in FIG. 3A. The tag 50 has a unique code installed in a RF transceiver 53. As shown, the tamper-sensing wrist-mount watch-style RFID tag 50 is also equipped with a reset push button switch 58 attached to an optical nylon conductive strap 56, a pair of strap connectors 57 attached to two opposing ends of the strap 56, a pair of infrared emitter and collector 51, and a pair of infrared strings 54 extending through the straps 56. When a pallet 100, 110 or a personnel carrying a tag 101, 112, 24, or 50 goes through a site station gate 23, the gate RFID read antenna 29 generates a magnetic field, which charges the built-in capacitors of the RFID tags 101, 112, 24, and 50. When the capacitor discharges, the RFID tag 101, 112, 24, and 50 transmit the uplink data thereof, and simultaneously power on the tags built-in RF transceiver circuitry for a predetermine time, for example, 30 sec. When the site station 20 computer receives said pallet or personnel transponder RFID data, it creates a time slot in the database of the computer 26 for said particular tag units 101, 112, 24, 50 and starts communicating with an RF signal with said tag units transceiver at time interval, through said site station RF transceiver 28, indicating the real time presence of said pallets 101,112 and personnel 27 at the particular site station location. In some application that site station 20 my not be equipped with RFID gate readers 22, the RFID-RF transceiver entering a building cannot be powered on by the gate RFID reader 22. In order to power up the tags RF transceiver 80, 50, the art provides additional, tag-reset switch 84, 58 which is designed to manually power up the tag's RF transceiver by pressing the reset button 84, 58 for a predetermined period of time such as 5 second.

If the built-in battery of the RFID-RF transceiver tag 101 of the pallet 100 or the personnel wrist transceiver 50 located inside the site station 20 goes low, said tag 101, 50 transmits at given time interval with an additional low battery code, to said site RF transceiver unit 28, which, upon receipt of said code, sends the received data into said side station computer 26, which will notify the computer operator with a tag maintenance requirement notification.

If the tamper sensing RFID-RF transceiver tag 90 is removed from said pallet 100, the pressure sensing tamper switch 91 sends signals to the tag RF transceiver, and the transceiver will initiate a tamper signal to said site RF transceiver 28, which, upon receipt of the signal, will send the tamper code data to said site computer interface 26 to notify operator of particular pallet tag tamper occurrence. The art teaches the same when unauthorized removal of tags 112, 50 is performed by detaching the strap connectors 57 or cutting the tag strap 56, 111 without prior tag removal authorization.

If a pallet 100 with a RFID-RF transceiver tag 101, or a personnel carrying RFID-RF transceiver tag 24, is removed or walked away from said site 20 (not through the site gate) without removal authorization code entry into said site station computer 26, when the pallet 21 goes out of site station RF transceiver 28 communication range, the site station computer will generate a security violation signal containing information to said particular pallet 21.

In a preferred embodiment of the invention, said RFID-RF transceiver tag 90 mounted on a pallet 101 is additionally equipped with a HI power 27 Mhz RF transmitter connected to said tag RF transceiver 90. When an unauthorized cargo departs from site 20, either through the site station gate 23 or gets removed out of the site station RF transceiver 28 communicating range, the site station RF transceiver 28 will issue an unique RF signal to said pallet tag 101, which, upon receipt, will activate the built-in HI Power transmitter to transmit at time interval signal containing information relating to said pallet tag ID 101 with stolen code. This helps security personnel to locate within 2 miles radius the stolen cargo by use of hand held monitor (picture not Shown).

If and when a cargo carrying an RFID-RF tag 101 or personnel tag 24 set by site computer 26 operator departs from the site station, upon exit of the tag 101 and 24 from the site station gate 23, the gate RFID reader 29, 22 reads the RFID tag data and send the data to the site station computer 26, and the computer 26 sends an RF signal to said departing tag RF transceiver 101, 24 to shut down it's RF transceiver power. If the site station 20 is not equipped with the gate RFID reader 22, when a cargo gets removed or personnel 27 becomes out of said site station 20 and the tag(s) 101, 24 goes beyond RF communicating range; RF transceiver of the tag(s) 101, 24 will power down automatically if the tag(s) 101, 24 does not communicate at time interval (more then 10 minutes) with the site station computer 26.

Figure 1B:
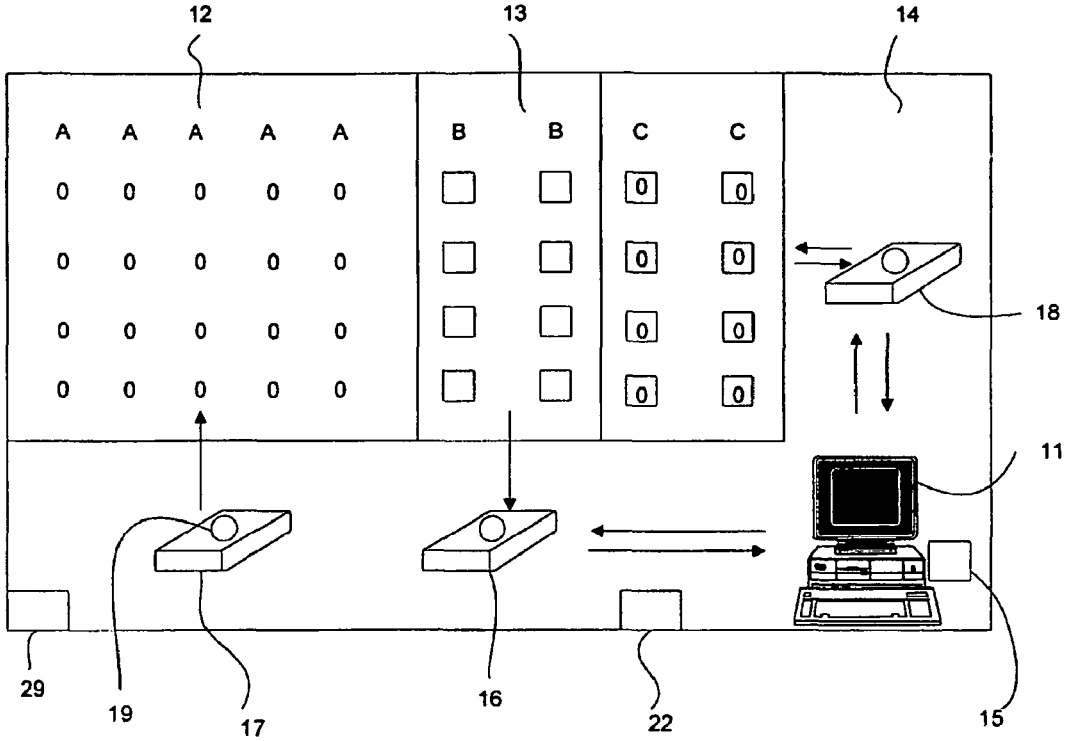
FIG. 1B illustrates a floor plane of a ware house that uses the monitoring system as shown in FIG. 1A.
Figure 1C:
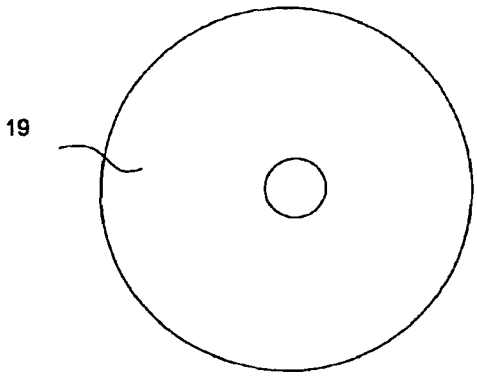
FIG. 1C illustrates a top view of the RFID transponder as shown in FIG. 1A.

Additionally the site warehouse 10 is equipped with partitions with doorways or partitions sections equipped with RFID tag readers 12, 13, 14 herein described as zone "A" "B" "C" as shown in FIG. 1B. When a pallet 17 or personnel 24 enters the partitioned warehouse site, the tag RFID reader 19 reads the pallet 17 or personnel tag ID 24 and sends the information into said site warehouse computer 11, indicating a particular tag or personnel entrance in said warehouse 10 partitions 12.

In a preferred embodiment, when the pallet 16 or personnel RFID tag 24 having RF transceiver is read by the warehouse computer 11 upon entering the warehouse partition 13, the computer 11 identifies the tag zone, which is zone "B" in this embodiment and communicates through said site RF transceiver 15 with said pallet 16 or personnel RF transceiver tag on a real time bases indicating the presence of the particular pallet 16 or personnel 24 in a partition at a site.

A unique GPS based tag 60 equipped with modem/pager and an RF transceiver is provided as shown in FIG. 3B. The tag 60 is equipped with a phone or pager antenna 66 and a GPS antenna 67, and a tamper sensing strap 61 used for mounting the tag 60 by wrapping the strap around a pallet or a personnel. The strap includes a conductive rubber strap and an optical nylon string 62 connected to said tag 60 by use of mounting pin post 63. The tag 60 has conductive and/or optical emitter collector points 64, 65. The emitter and the collector 64, 65 communicate with an infrared signal through said strap or a conductivity point to complete the conductive circuit. Loss of conductivity signal and or IR signal causes the tag 60 to transmit a tamper signal. In another embodiment the pallet 18 is equipped with a GPS/cellular.

A modem or a 2-way pager tag is attached to a pallet 18 present a site warehouse partition 14. When the pallet 18 is moved out of said warehouse site 10 without warehouse computer 11 authorized access entry, and the tag of the pallet 18 goes through the gate reader 22, 29, the RFID tag powers on the built-in RF transceiver, the reader 22, 29 upon reading the tag ID, sends the information into said site warehouse computer 11 which initiates a signal to the RF transceiver of the tag of the pallet 18 to activate said pallet's HI power transmitter and GPS/cellular modem. To help locate the cargo with both GPS and RF signals, a site computer 11 or a hand held RF monitor (picture not shown) can be used. Wherever GPS signal is not available, such as under building, parking structures, the security personnel relies on locating the stolen cargo by hand held RF monitor.

In another embodiment of invention, if the warehouse site 10 is not equipped with a gate RFID reader unit 22, 29. When a pallet within the warehouse is to be removed from set site 10, a computer 11 generates an RF command to said particular departing tag, which, upon receipt of signal, will power down the RF transceiver circuitry of the pallet 18, and the pallet can be moved safely out of the site.

If the pallet 18 is moved out of the warehouse site 10 without going through gate reader 22, 29, and the pallet 18 carrying RFID-RF transceiver with built-in GPS modem becomes out of the communication range of the site warehouse RF transceiver 15, the RF transceiver of the pallet 18 will power up the built-in HI power RF transmitter and the GPS/modem, which transmits a HI power RF signal and a GPS location signal to helps security personnel to locate the cargo containing the pallet 18 both with GPS and RF monitoring devises.

The art can be used for monitoring personnel 27 by use of a RF transceiver and a GPS. A personnel 27 carrying a tamper proof GPS/modem, 2 way pager or satellite unit 24a with a built-in RF receiver, in which only the pager receiver is operative at a very low power stand by mode, and a temper detection wrist RFID-RF transceiver 24 communicating with a site RF transceiver unit 28 at time interval, indicating real time presence of a personnel 27 at a site. When the personnel 27 departs from said site, the side RF transceiver 28 no longer receives RF signal from the personnel's wrist transmitter 24, the site computer 26 initiates an RF signal through said site RF transceiver 28 into said personnel GPS/pager receiver 24a to power up the GPS unit and it's onboard receiver unit, which upon power up, start receiving RF signals at time interval from said personnel wrist transmitter 24, and logs said received data in it's memory.

Simultaneously the personnel GPS unit 24a receiver receives satellite location data. The built-in pager unit upon receiving interrogations or at preset time or real time transmits signals containing information to said particular personnel 27 location information. When the personnel 27 returns back to the site 20, personnel wrist tag 24 establishes communication with the site computer 26, which upon receipt of said signal will transmit a signal to power down said GPS/pager unit 24a along with built-in RF receiver.

The embodiment of the invention relates the same to when pallet 100, 110, or personnel 24 enter the vehicle 30, the vehicle gate 41 is open, and the vehicle RFID tag reader 32 energizes the antenna 40. When the pallets 100 or personal 27 go through said vehicle gate reader 32, 40, the pallet RFID transponder powers on the tags RF transceiver, and the vehicle RFID tag reader 32, 40 reads tag ID and sends the read ID data to vehicles RF transceiver CPU 36, which upon receipt will create a communication slot in its data base, and sends short range RF signals to establish communication with the tags 100, 110, by logging on a real time bases the presence of certain pallets or personnel within the vehicle.

If and when a product carrying an RFID-RF transceiver tag 21 is being unloaded from a truck 30 at a site 20. The vehicle gate reader 40, 32 reads the tag ID, and sends the read tag data to vehicle RF transceiver unit 36, which upon receipt will transmits an RF signal containing information to said tag data, into said site station transceiver 28, which upon receipt of said signal, will download the information into site computer 26 data base, indicate a particular cargo 21 drop off near the site 20, and send a confirmation RF signal back to said vehicle RF transceiver CPU 36, which upon receipt of signal, transmits a RF signal to said unloaded tag 21 to power down the tags RF transceiver. If the wrong pallet 21 being unloaded by driver 27 at a site 20, the site computer 26 upon receipt of said tag ID information from said vehicle transceiver CPU 36, the site station computer 26 initiates a signal, into said vehicle transceiver unit 36 to ring an alarm signal to the driver 27, warning the driver removal of wrong cargo from vehicle 30 at the site. If the driver 27 does not comply, the vehicle RF transceiver 36 will not initiate a power down RF signal to the wrong cargo tag 21, the tag being equipped with an HI power transmitter, at predetermined time, the tag 21 start automatically transmitting at time interval a stolen cargo alarm signal, which helps authorities or security personnel to locate the stolen cargo by use of hand held RF monitor unit.

In a preferred embodiment the pallet tag 18 additionally is equipped with GPS/cellular modem or 2 way pager, during an unauthorized removal of pallet from said vehicle 30, said pallet tag unit 19 upon passing the vehicle gate reader 32, 40 will power on the tags GPS/Cellular modem, pager. The built-in GPS/modem receiver logs the satellite positioning signals in its data base and transmits said pallet tag ID information along with GPS location information. This will expedite to locate the stolen pallet by a monitoring station computer 26 equipped with GPS map.

In a more preferable embodiment of the invention the vehicle is equipped with a tamper sensing GPS and cellular antenna, 31, 130 a tamper sensing GPS/Cellular modem or 2 way pager unit 38, 120 which is connected the a vehicle RF tamper sensing RF transceiver unit 36, 120 and the vehicle Gate RFID reader 40, 32. Additionally the GPS and the RF transceiver unit 120 are communicating through vehicle harness 126 by use of encryption data with vehicle immobilizer CPU 128. The vehicle RF transceiver 36 is also connected to the vehicle gate electronic solenoid deadbolt 34, to open and close said vehicle gate by use of driver key fob.

When a pallet 21 is located at a site station waiting to be loaded on a vehicle 30, the site station warehouse computer 26 operator, upon entry of the content, tag, and destination information of the pallet 21 into said site computer 26, which upon sending command, will transmit the particular tag of the pallet 21 product content information and destination information into said vehicle GPS unit CPU 38, through a cellular modem or 2 way pager. The vehicle GPS CPU 38 logs said information in its database. When the vehicle 30 arrives the logged address destination (longitude/latitude) the vehicle GPS unit 38 gives a signal to the vehicle RF transceiver unit 36, which upon receipt of said signal will allow driver 27 key fob generating RF signal to open the gate lock solenoid 34 of said vehicle, at the given address. The driver 27 then precedes prompt delivery of pallet. The delivery information can be polled via the cellular modem from any given site station computer network, intranet or Internet system. Since the vehicle RF transceiver 36 at time interval communicating with vehicle pallet tags, said information could be polled by computer operator at a site 26, to help site station 20 be able monitor a mobile vehicle 30 and it's content at any given location, and be able to know estimated time of arrival of cargo, and monitor real time content of a vehicle.

On a none designated address location, if driver 27 decides to open vehicle gate solenoid lock 34 by use of given key fob, example "to steal the cargo", the vehicle RF transceiver 36 will not respond to given signal to activate vehicle door solenoid 34. First the vehicle RF transceiver 36 must receive vehicle GPS unit 38 signal, which is produced only if the vehicle physical location is at the given address location.

The GPS antenna 31, and GPS/phone antenna 130 is equipped with a pressure sensing tamper switch 133 with a protective "O" ring 134 on the mounting side, the mounted side is against the vehicle inner or outer body or glass. Additionally the GPS antenna and modem antenna 31, 130, 131, 132 has built-in processor 135, producing encryption data, said data is transmitted through said antenna wire 136 into said GPS unit 120. The GPS unit is equipped with a data processor 124 to process the incoming encryption codes. The GPS unit 120 is connected to vehicle harness 126 which is used to sends the encryption data through vehicle harness to a vehicle immobilizer CPU 128, which is equipped with a data read processor 137, which upon receipt of data will enable the vehicle starter or fuel pump 129 or vehicle/trailer brakes.

If the vehicle GPS/Cell antenna 130 or GPS/modem 120 is being removed, the pressure sensing switch 121 is tripped, or if an attempt is made to disconnect the harness or cut the harness wires 126, 136 to the GPS/modem or GPS antenna, the GPS antenna 31, 130 and the GPS/modem 38, 120 unit will no longer transmit encryption data flow into the vehicle immobilizer CPU 128, the vehicle 30 becomes inoperative. For example, the vehicle starter will be disabled 129, the fuel pump will be gradually shut off 129, and the vehicle (truck/trailer) brakes will be gradually engaged.

Figure 2:
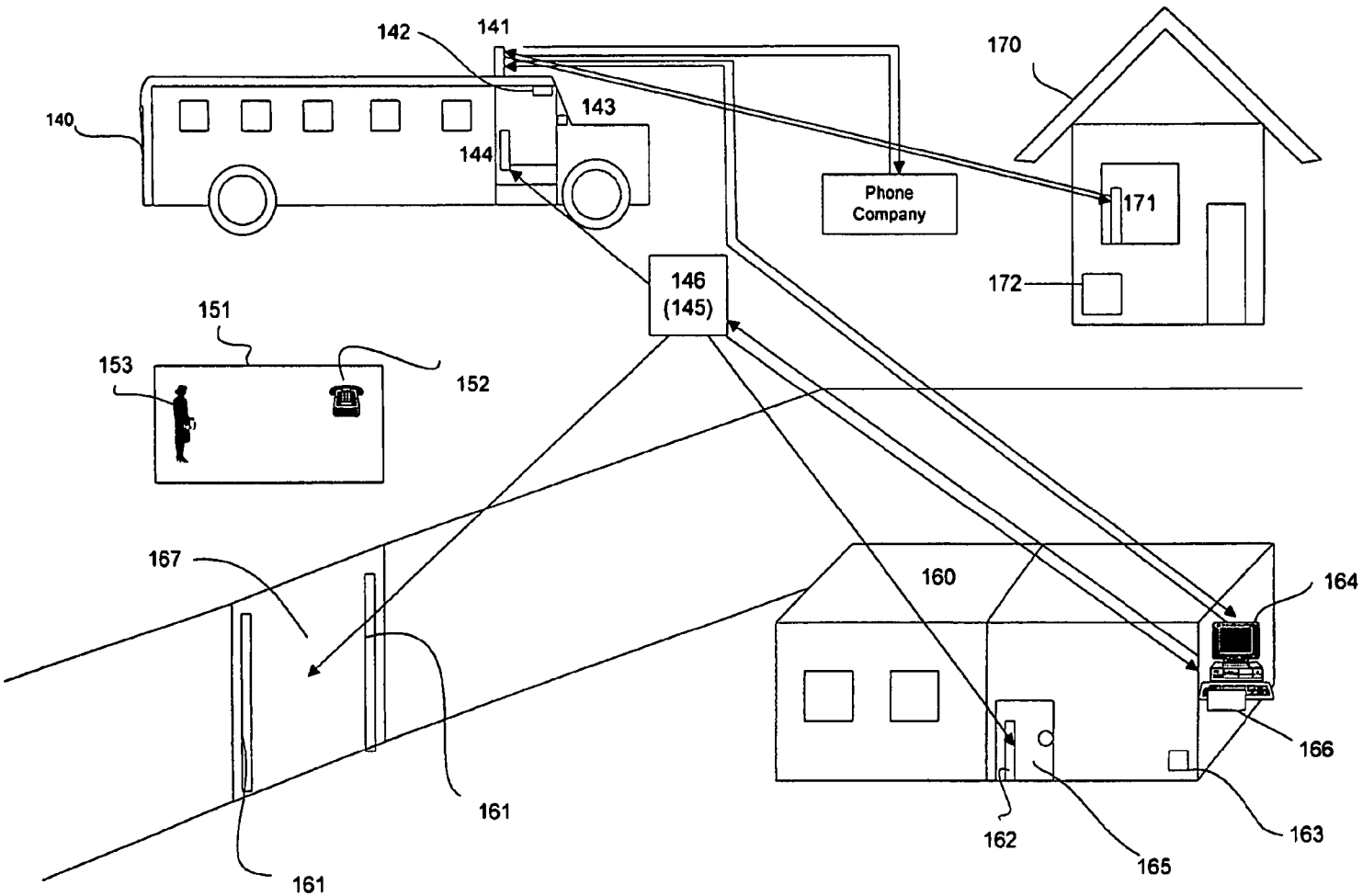
FIG. 2 illustrates a monitoring system for tracking the attendance of personnel (student)

The art has other application to provide safety personnel (student) as shown in FIG. 2A. Transportation and tracking is performed by use of vehicle mount RF transceiver 142 unit with a built-in counter counting electronically entered or exit personnel, which is connected into vehicle door mount RFID tag read unit 143, 144. The vehicle RF transceiver unit 142 communicates with house RF transceiver/autodialer units 171, 172, and communicates with a school RF transceiver unit 166. In addition, the vehicle GPS/modem 141 contains information to an ID tag 145 of a personnel 146 along with pick up or drop of address information. The GPS unit is connected into the vehicle mount door RFID tag read unit 143, 144, which will read RFID tag 145 worn by student, driver, and communicates with vehicle RF transceiver 142 and GPS unit 141.

Each student 146 wearing a wristwatch style RFID tag 145 or a badge in a house. A vehicle (bus) 140 sending RF time interval coded signal related to particular house unit's code, representing a route. When a house transceiver unit 171, 172 receives a particular bus 140 RF signal, the house transceiver unit 171, 172 will produce a musical chime indicating particular bus arrival, with assigned route information. The student(s) 146 exit the house and enter the bus 140. Upon entry, the bus gate reader 143, 144 reads the individual tag ID and sends the information to vehicle RF transceiver 142 and GPS/ modem unit 141. Upon receipt of personnel ID signal, the vehicle RF transceiver 142 transmits a RF signal containing information to ID information of said vehicle 40, Driver and student 146, into said home RF transceiver unit 171, 172, which upon receipt of signal, will send the information through phone line 150 into school computer 164, and autodials preprogrammed phone numbers and plays back prerecorded voice massage, to the phone 152 of the office 151 where the parent(s) or guardian(s) 153 locates or to the mobile phones thereof, indicating a particular student has departed from the house 170. The vehicle GPS unit 141 will review the location address (Longitude/latitude) upon receipt of said student RFID read signal. If the ID of the picked up student matches the stored address and student data of the GPS unit, the picket up student, bus, driver and location information is sent via a cellular, UHF/ or pager network into a school computer 164, or said pick-up information is stored in it's data base, and the data is downloaded upon a polling requested from a monitoring site 164. If the entered personnel ID does not match given bus GPS CPU unit 141 data, the GPS unit 141 signals to the driver 147 indicating person entering the vehicle is not assigned for the particular vehicle route.

When the vehicle 140 arrives school 160, the student(s) 146 will depart from the vehicle 140, and the vehicle door read unit 143, 144 reads the departing student tag (s) ID numbers with counter indication, and each departing student ID will be checked out of the vehicle RF transceiver unit 142. The departing student ID information is downloaded via an RF 142 signal into school computer interface 166, 164, which indicates the presence of student dropped off at the particular school site 160.

The vehicle GPS unit 141 will log in its memory the departing students ID, time and location, for future polling references.

Since each one of said school(s) 160 is equipped with school gate 167 or classroom door 165 RFID reader 161, 162. When a student 146 enters the school gate 167 or classroom 165, the gate or door reader 161, 162 will read student ID and log into school computer 164 school attendance of the student.

In a preferred embodiment of the invention each student wrist RFID tag 145 has a built-in RF transceiver, which upon entry of school gate 167 or particular classroom door 165 the wrist RF transceiver 145 will communicate with the school computer 164 at time interval to ascertain real time presence of student at a particular school.

When student depart from school 160, the school gate or classroom door reader(s) 161, 162, 163 reads the student RFID tag 145, and the read data is transmitted to the school computer 164 indicating student departure from school, at a given time and date. If and when student 146 enters the bus 140, the bus door reader 144 will read student ID and send said information into bus RF transceiver unit 142, which upon receipt transmits an RF signal containing information to said bus ID, driver ID, and student ID to said school computer 164, which upon receipt will register the event. The vehicle GPS/modem unit 141 logs such event for future polling needs by monitoring site or transmits said data.

When the bus 140 is near by a student dropping address (Home) 170, the bus RF transceiver 142 is transmitting its identification signal, when the home transceiver unit 171, 172 picks-up the signal, the home transceiver 172 will sound a chime sound indicating bus arrival. Upon bus arrival at given home site 170, the student 146 carrying tag departs from vehicle 140, the door reader 144, 143 reads the student wrist tag ID 145, and sends it to vehicle RF transceiver unit 142, which upon receipt transmits an RF signal containing information to said student ID, driver ID, and the bus ID to said particular site home 170 receiver unit 171, 172. The home transceiver unit 171, 172 upon receipt of said signal, sends the information through phone line 150 into school computer 164, and autodials into a pre-programmed phone numbers and plays back pre-recorded voice message to the answering party 153 answering the phone 152, notifying the person (parent) 153 the safe arrival of student at home. The vehicle GPS units 141 compares the student ID 145 with a given address 170 in it's data logger memory, if given address 170 matches student ID, it logs the event in its memory or reports it to school computer via vehicle wireless modem. If the departing student ID 145 does not match the location address 170, the vehicle GPS unit 141 will warn the driver 147 with an audiovisual or vibrating signal. The school computer 164 could be connected to an intranet or operate on the Internet. Additionally with the use of Internet, bus arrival or departure could be monitored in office, home computers, laptops and PDA by parents, student, school administrative and dispatch centers.

What is claimed is:

1. A system for securing and tracking cargo contents delivered by a plurality of vehicles to and from a plurality of site stations, comprising:

[a)] a plurality of RFID tags each being attached to one of the objects and [pre-storing] *configured to pre-store* an identification information thereof;

[b)] a plurality of site stations each comprising:

[b1)] a site computer [pre-storing] *configured to pre-store* identification information of the RFID tags and content information of the objects to be removed from or loaded in the site station; and

[b2)] a site RFID tag reader [operative] *configured* to read the identification information pre-stored in the RFID tags [upon] *when* exiting or entering the site station, and to send the identification and content information to the site computer; and

[c)] a plurality of vehicles each comprising:

[c1)] a vehicle RFID tag reader [operative] *configured* to read the identification information pre-stored in the RFID tags [upon] *when an object carrying a tag is* exiting or entering the vehicle; and

[c2) a vehicle] *an* RFID *tag reader* transceiver [CPU pre-storing] *unit configured to pre-store* identification information of the vehicle, the [vehicle] RFID *tag reader* transceiver [CPU being operative] *unit is further configured* to receive the identification information read by the vehicle RFID tag reader and transmit a signal carrying the identification information read by the vehicle RFID tag reader and the identification information of the vehicle to the site computer.

2. The system of claim 1, wherein each of the RFID tags further comprises:

a processor encoded with the identification information and [pre-storing] *configured to* the content information of the object that the RFID tag is attached thereto;

a built-in antenna [interrogating] *configured to interrogate* with the site RFID tag reader and the vehicle RFID tag reader [upon] *when* entering or exiting the site station and the vehicle, respectively, so as to [received] *receive* a magnetic field therefrom;

a capacitor *configured* to be charged by the magnetic field; and a low-power RF transceiver [operative] *configured* to transmit a signal carrying the identification information and content information pre-stored in the RFID tag while being activated by discharge of the capacitor.

3. The system of claim 2, wherein the site computer is [operative] *further configured* to compare the identification and content information carried by the signal with the identification and content information pre-stored therein.

4. The system of claim 3, wherein the site computer is [operative] *further configured* to communicate with the RFID tag at a predetermined time interval when the identification and content information carried by the signal matches the identification and content information pre-stored therein.

5. The system of claim 3, wherein the site computer is [operative] *further configured* to generate an alarm signal when the identification and content information carried by the signal mismatches the identification and content information pre-stored therein.

6. The system of claim 2, wherein each of the RFID tags further comprises a high-power transmitter connected to the low-power RF transceiver.

7. The system of claim 6, wherein the high-power [transmitted] *transmitter* is activated when the low-power RF transceiver receives a signal from the site computer indicating an unauthorized removal of the object and the RFID tag attached thereto.

8. The system of claim 7, wherein each of the RFID tags further comprises a built-in GPS receiver and a wireless modem powered on with the high-power transmitter [for receiving] *configured to receive* location information from orbiting satellite and transmit the location information to the site computer or the [vehicle RF transceiver CPU] *RFID tag reader transceiver unit*.

9. The system of claim 1, wherein each of the RFID tags further comprises a pressure sensing tamper switch.

10. The system of claim 9, wherein the pressure sensing tamper switch is protected by a metal O-ring.

11. The system of claim 1, wherein each of the RFID tags [includes] *comprises* a tamperproof strap or shrinking wrap for mounting the RFID tag to the object.

12. The system of claim 11, wherein the tamperproof strap or shrinking wrap [are made of] *comprise* conductive material.

13. The system of claim 11, further comprising an optical emitter and an optical collector attached to two opposing ends of the tamperproof strap or shrinking wrap.

14. The system of claim 13, wherein the RFID tag is [operative] *further configured* to transmit a tamper signal when communication between the optical collector and the optical emitter is interrupted.

15. The system of claim 1, wherein each site station further comprises a RFID gate reader antenna *configured* to energize the RFID tags passing therethrough.

16. The system of claim 1, wherein each site station further comprises an RF site antenna [in communication] *configured to communicate* with the site computer and the [vehicle RF transceiver CPU] *RFID tag reader transceiver unit* of at least one of the vehicles.

17. The system of claim 1, wherein each site station further comprises a site antenna [for in communication] *configured to communicate* with the site computer.

18. The system of claim 1, wherein each site station [includes] *comprises* a plurality of partitions, and each partition [includes] *comprises* an RFID tag reader *configured* to interrogate the RFID tags attached to the objects entering or exiting the partition.

19. The system of claim 1, wherein each vehicle further comprises a vehicle gate reader antenna *configured* to energize the RFID tag entering or exiting the vehicle.

20. The system of claim 1, wherein each vehicle further comprises a vehicle GPS [CPU] *unit configured* to compare pre-store destination information with current location information of the vehicle.

21. The system of claim 20, wherein each vehicle further comprises a gate-locking mechanism *configured to* automatically [locking] *lock* a gate of the vehicle when the pre-stored destination information mismatches the current location information.

22. The system of claim 20, wherein each vehicle further comprises a gate-locking mechanism *configured to* automatically [unlocking] *unlock* a gate of the vehicle when the pre-stored destination information matches the current location information.

23. The system of claim 1, wherein the objects [include] *comprise* a plurality of cargo units.

24. The system of claim 1, wherein the objects [includes] *comprise* at least one personnel.

25. The system of claim 1, wherein each of the RFID tag *is* further [pre-stores] *configured to pre-store* content information and destination information of the objects to which the RFID tag is attached.

26. A system for securing and tracking objects transported by a vehicle between a plurality of site stations, comprising:

[a)] a plurality of RFID tags each being attached to one of the objects and [pre-storing] *configured to pre-store* an identification information thereof;

[b)] a plurality of site stations, at least one of the site stations comprising:

[b1)] a site computer [pre-storing] *configured to pre-store* identification information of the RFID tags and content information of the objects to be removed from or loaded in the site station; and

[b2)] a site RFID tag reader [operative] *configured* to read the identification information pre-stored in the RFID tags [upon] *when* exiting or entering the site station, and to send the identification and content information to the site computer; and

[c)] the vehicle comprising:

[c1)] a vehicle RFID tag reader [operative] *configured* to read the identification information pre-stored in the RFID tags [upon] *when an object carrying a tag is* exiting or entering the vehicle; and

[c2) a vehicle] *an* RFID *tag reader* transceiver [CPU pre-storing] *unit configured to pre-store* identification information of the vehicle, the [vehicle] RFID *tag reader* transceiver [CPU being operative] *is further configured* to receive the identification information read by the vehicle RFID tag reader and transmit a signal carrying the identification information read by the vehicle RFID tag reader and the identification information of the vehicle to the site computer.

*27. The system of claim 1, wherein the RFID tag reader transceiver unit is further configured to read vehicle cargo, vehicle driver or passenger RFID tags; and*

*wherein the plurality of vehicles each further comprises:*

*a GPS modem or pager unit configured to transmit and receive signals to and from at least one of site station computers or to a monitoring station network, the signals comprise of at least one of vehicle location information, vehicle driver authentication, vehicle cargo content, and vehicle tampering status.*

*28. The system of claim 27, wherein at least one of the RFID tag reader transceiver unit and GPS modem or pager unit are configured to detect tampering therewith, and are*

*further configured to send a signal to do at least one of (i) slowly cut off vehicle engine fuel supply to safely stop the vehicle or immobilize a vehicle engine, and (ii) lock the vehicle, in response to detection of tampering.*

*29. The system of claim 28, wherein at least one of the GPS modem or pager unit and the RFID tag reader transceiver unit further comprises a pressure sensing tamper switch,*

*wherein the pressure sensing tamper switch is mounted on at least one side of the RFID tag reader transceiver unit, GPS modem or the pager unit, or the RFID tag reader transceiver unit and GPS modem or the page unit; and*

*wherein a GPS modem or pager unit tamper detection switch is configured to detect tampering of the RFID tag reader transceiver unit and, in response to the tampering, the GPS modem or pager unit is further configured to transmit a signal comprising information regarding the tampering and location information of the vehicle.*

*30. The system of claim 28, wherein at least one of the RFID tag reader transceiver unit and GPS modem or pager unit are further configured to send a signal indicative of tampering to at least one of the site station computers or the monitoring station network in response to the detected tampering.*

*31. The system of claim 28, wherein at least one of the GPS modem or pager unit and the RFID tag reader transceiver unit are further configured to send data to a vehicle immobilizer unit to allow continued operation of the vehicle, and*

*wherein the vehicle immobilizer unit is configured to immobilize the vehicle upon halting of flow of data thereto.*

*32. The system of claim 27, wherein the GPS modem or pager unit is further configured to determine a location of the vehicle and compare the vehicle location to a database storing at least one object RFID tag identification information comprising tag destination information, and is further configured to send an alarm signal to one or more of (i) to the driver of the vehicle, (ii) at least one of the site station computers and (iii) the monitoring station network when the vehicle location route does not match a specified destination location for an object RFID tag stored in the database.*

*33. The system of claim 27, wherein the GPS modem or pager unit is further configured to receive a signal related to destination information for objects or persons in the vehicle, and wherein the GPS modem or pager unit is further configured to transmit a signal to allow the vehicle to be unlocked for loading or unloading when a vehicle GPS location matches the objects or persons destination information.*

*34. The system of claim 27, wherein the GPS modem or pager unit is further configured to receive a signal from at least one of the site station computers and monitoring station computer networks to prompt delivery or pick-up of the objects, a driver or a passenger at a specified location, or to confirm the boarding of an object, driver or passenger at the specified location.*

*35. The system of claim 27, wherein the GPS modem or pager unit further configured to communicate with the RFID tag reader transceiver unit, and*

*wherein at least one of the RFID tag reader transceiver unit and the GPS modem or pager unit is further configured to transmit signals to at least one of the site station computers and monitoring station computer network in relation to loading or unloading of the objects having the RFID tags as read by the vehicle RFID tag reader.*

*36. The system of claim 35, wherein the GPS modem or pager unit is further configured to transmit signals to at least one of the site station computers and monitoring station computer network to provide information on at least one of the real time content of objects carried in the vehicle, the location of the vehicle, and/or the estimated time or arrival of the vehicle at a specified location.*

*37. The system of claim 35, wherein at least one of the GPS modem or pager unit and the RFID tag reader transceiver unit is further configured to initiate an alarm signal, during loading and unloading, when actual vehicle position information does not match an object RFID tag given destination address.*

*38. The system of claim 27, wherein the vehicle comprises a driver or passenger RFID tag reader is further configured to read identification information pre-stored in a driver or passenger RFID tag attached to a driver or passenger of the vehicle, and*

*wherein the GPS modem or pager unit is further configured to communicate with the driver or passenger RFID tag reader and is further configured to transmit a signal carrying the driver or passenger identification information and GPS location information to at least one of the site station computers or the monitoring station.*

*39. The system of claim 38, wherein the GPS modem or pager unit is further configured to initiate an alarm signal upon detection of driver or passenger identification information that is indicative that the wrong passenger or driver has boarded the vehicle.*

*40. The system of claim 27, wherein the GPS modem or pager unit is further configured to transmit a security violation signal when receiving a security violation code signal from at least one of the site station computers and the monitoring station computer network that is indicative of theft of the objects or vehicle, and*

*wherein the security violation signal comprises vehicle location information.*

*41. The system of claim 1, wherein the RFID tag reader transceiver unit is further configured to detect tampering therewith, and is further configured to send a signal to perform at least one of (i) slowly cut off vehicle engine fuel supply to safely stop the vehicle or immobilize a vehicle engine, and (ii) lock the vehicle, in response to detection of tampering.*

*42. The system of claim 41, wherein the RFID tag reader transceiver unit comprises with a pressure sensing tamper switch.*

*43. The system of claim 41, wherein the RFID tag reader transceiver unit is further configured to send a signal indicative of tampering to at least one of site station computers in response to the detected tampering.*

*44. The system of claim 41, wherein the RFID tag reader transceiver unit is further configured to send data to a vehicle immobilizer unit to allow continued operation of the vehicle, and*

*wherein the vehicle immobilizer unit is configured to immobilize the vehicle when halting of flow of data thereto.*

*45. The system of claim 1, wherein the RFID tag reader transceiver unit is configured to transmit a signal to allow the vehicle to be unlocked for loading or unloading when a verification signal is received from the site computer.*

*46. The system of claim 1, wherein the RFID tag reader transceiver unit is further configured to receive a signal from the site computer to prompt delivery or pick-up of the objects, a driver or a passenger, or confirm the boarding of an object, driver or passenger.*

*47. The system of claim 1, wherein the RFID tag reader transceiver unit is further configured to transmit signals to the*

*site computer in relation to loading or unloading of the objects having the RFID tags as read by the vehicle RFID tag reader.*

*48. The system of claim 1 wherein the RFID tag reader transceiver unit is further configured to transmit signals to the site computer at preselected intervals that carry information on content of the vehicle.*

*49. The system of claim 48, wherein the RFID tag reader transceiver unit is further configured to initiate an alarm signal, during loading and unloading, when actual vehicle position information does not match an object RFID tag given destination address.*

*50. The system of claim 1, wherein the vehicle comprises a driver or passenger RFID tag reader configured to read identification information pre-stored in a driver or passenger RFID tag attached to a driver or passenger of the vehicle, and*

*wherein the RFID tag reader transceiver unit is further configured to communicate with the driver or passenger RFID antenna and to transmit a signal carrying the driver or passenger identification information to the site station computer.*

*51. The system of claim 50, wherein the RFID tag reader transceiver unit is further configured to initiate an alarm signal upon detection of driver or passenger identification information that is indicative that a wrong passenger or driver has boarded the vehicle.*

*52. The system of claim 1, wherein the RFID tag reader transceiver unit is further configured to transmit a security violation signal when receiving a security violation code signal indicative of theft of the objects from the vehicle or theft of the vehicle from the site station.*

*53. The system of claim 11 wherein the RFID tags comprise a tamperproof strap comprising at least one of an optical nylon string, a conductive strap, or the optical nylon string and the conductive strap used to wrap the RFID tag on an object, and*

*wherein the RFID tags are further configured to transmit a tamper signal when the tamperproof strap is tampered with or broken.*

*54. The system of claim 8, wherein the RFID tags comprising the GPS receiver and wireless modem comprise a tamperproof strap,*

*wherein the tamperproof strap comprising at least one of an optical nylon string, a conductive strap, or the optical nylon string and the conductive strap, and*

*wherein the RFID tags are further configured to transmit a tamper signal comprising the RFID tag GPS location via the wireless modem when the tamperproof strap is tampered with or cut.*

*55. The system of claim 8, wherein the GPS receiver and wireless modem on the RFID tag are further configured to be powered up when receiving a signal via interrogation with the vehicle tag RFID reader, that unauthorized removal of an object from a vehicle has occurred, and are further configured to transmit a signal in relation to a GPS location of the object to at least one of the site stations and monitoring station network to allow location of the object.*

*56. The system of claim 2, wherein the RFID tags are configured to be powered up when receiving a signal, via interrogation with the vehicle tag RFID reader, that unauthorized removal of an object from a vehicle has occurred, and are further configured to transmit a security violation signal.*

*57. The system of claim 27, wherein the GPS modem or pager unit are configured to utilize RF communication.*

* * * * *